United States Patent [19]

Hasselman, Sr.

[11] 4,246,230

[45] Jan. 20, 1981

[54] SYSTEM FOR FORMING AND DISPENSING A RESINOUS FOAM

[76] Inventor: Walter J. Hasselman, Sr., Scarsdale, N.Y.

[21] Appl. No.: 901,184

[22] Filed: Apr. 28, 1978

Related U.S. Application Data

[63] Continuation-in-part of Ser. No. 744,784, Nov. 24, 1976, abandoned.

[51] Int. Cl.[3] .......... B01J 4/02; B01J 19/26

[52] U.S. Cl. .......... 422/133; 521/917

[58] Field of Search .......... 422/133; 521/917

[56] References Cited

U.S. PATENT DOCUMENTS

| | | | |
|---|---|---|---|
| 2,779,689 | 1/1957 | Reis | 422/133 X |
| 2,885,268 | 5/1959 | Breer et al. | 422/133 |
| 3,231,363 | 1/1966 | Renner | 521/188 X |
| 3,627,275 | 12/1971 | Gusmer | 422/133 X |
| 3,740,355 | 6/1973 | Klug | 521/188 X |
| 3,960,506 | 6/1976 | Schmitzer | 521/917 X |
| 4,115,066 | 9/1978 | Muhle | 422/133 |
| 4,170,440 | 10/1979 | Gusmer et al. | 422/133 X |

*Primary Examiner*—Barry S. Richman

*Attorney, Agent, or Firm*—Pennie & Edmonds

[57] ABSTRACT

A system and method is disclosed for continuously producing and dispensing foam material including storage containers with respective delivery lines for delivering, via separate motor driven pumps, a foaming agent solution and curable synthetic resinous material to a mixing gun. An air compressor supplies compressed air which is first heated and then directed to the mixing gun wherein the components are mixed in the proper proportions to produce and dispense foam to the point of placement. The system includes an electric motor which conjointly drives the separate pumps which supply the constituent materials to the mixing gun under predetermined constant pressures and continuous flow conditions so as to produce a homogeneous and continuous foam product of desired density generally free of streaks and inconsistencies. In one embodiment, pumping of the materials is accomplished by conjointly driven diaphragm piston-type pumps connected to a gear box of desired gear ratio and driven by the electric motor in a manner to provide high torque with relatively low motor power. In a second embodiment, pumping is accomplished by conjointly driven gear pumps in which at least one gear is of a type having internal teeth for pumping.

14 Claims, 4 Drawing Figures

SYSTEM FOR FORMING AND DISPENSING A RESINOUS FOAM

CROSS REFERENCE TO RELATED APPLICATION

This application is a continuation-in-part application of U.S. Patent application Ser. No. 744,784, filed Nov. 24, 1976 and now abandoned.

BACKGROUND OF THE INVENTION

1. Field of the Invention

This particular invention, in general, pertains to a foam forming and delivery system and method. More specifically, it is directed to a simple, inexpensive, compact, and highly reliable system and process for ensuring accuracy and consistency in metering, mixing and delivering the constituent materials which form foam as well as improving the application thereof under adverse temperature conditions.

2. Description of the Prior Art

Heretofore several prior art attempts have been undertaken in the foam applicating field in an attempt to effectively and efficiently form and apply foam to appropriate working areas. Typically, such foam material may be utilized for purposes of providing thermal and/or acoustical insulation barriers which are particularly useful in the building and construction field. The very nature of the construction and building industry is such that ordinarily the foam applying procedure must occur at widely differing locations.

Generally speaking, the standard operating procedure for producing this type of foam encompasses pumping curable synthetic resinous material and a foaming agent with pressurized fluid individually from large separate drums into a suitable mixing gun. Additionally, pressurized fluid, such as air, from a conventional air compressor or the like is directed to the gun for purposes of mixing with the resinous agent and the foaming agent so as to form the foam product. The mixing gun suitably mixes and dispenses the formed foamed material.

One considerable problem commonly encountered in effectively operating such a system is ensuring a proper and continuous mixing of the desired quantities of the constituent ingredients which form the foam. If the correct preselected ratio of ingredients is not consistently delivered to the mixing point, the foam may not form. In many instances if the foam does form, it will not be of the proper composition and therefore will be unsatisfactory for the intended purposes. For instance, if formed at all, defects will arise in the final product, such as material streaking, excessive water loss, foam decomposition, and noxious odors. It is extremely important to ensure that the preselected mixing ratio during foam formation is consistently met and maintained, otherwise a very unsatisfactory product will result.

Given the fact that the mixing gun may be separated from the material containing drums by considerable distances, another problem which resides in this prior art system is that very significant pumping forces are required to successfully transfer the material to the mixing gun while maintaining the requisite pressures of the gun. Thus, pumping the materials under consistent conditions over large distances has, in the past, also contributed to the production of defective foam products.

Earlier approaches in pumping the foaming agent and curable synthetic resinous materials to the foam mixing gun included the use of pressure vats or chambers. Such vats usually received charges of the appropriate material to be transferred and were suitably pressurized so as to force the material to the mixing gun. A particular disadvantage associated with the foregoing arrangement was that the vats were often large and bulky. This very cumbersome characteristic was a great drawback at on-site job locations. Moreover, with the advent of relatively stringent federal standards concerning occupational safety hazards, these types of pressure vats had to be reconstructed so as to be even larger, heavier and sturdier. This rendered them even less acceptable and less suitable for commercial use not only from a cost standpoint but, in addition, from a handling standpoint. The foregoing shortcomings were compounded by the fact that the vats would have to be refilled after each charge of material was dispensed.

Another prior art approach for on-site application of foam involved a conventional type of vertical pneumatic displacement piston pump in combination with material supply drums and a mixing gun. In the customary arrangement, these pumps are positioned within the standard material supply drums to pump the materials under suitable pressure. This system had, inter alia, a significant shortcoming in that the repeated reversal of the piston direction resulted in fluid pressure cycling and fluctuations during the pumping of the materials. The considerable adverse effects accompanying these pressure fluctuations resulted in the innaccurate proportional mixing of the foaming agent and curable synthetic materials. Thus, there was no assurance that the curable synthetic resin and foaming agent material would be delivered to the mixing gun in the predetermined volumes or quantities desired for producing the foam product of choice.

To achieve a successful production of insulating and/or acoustical foam material, the various constituent materials, including the curable synthetic resin and foaming agent, must be continually mixed together in the proper predetermined amounts. Otherwise, the finished foam product, if formed at all, would lack the uniformity and consistency necessary to meet the building specifications for products of this type. For instance, when the pumping is inconsistent, it is not uncommon to have the foam material components streak during discharge from the gun, with the result that incorrect amounts of the ingredients would be mixed. Other adverse results associated with such inconsistencies are that the foam would not set-up properly and in many instances, would eventually collapse. Moreover, when the foam actually is collapsed, there is the additional drawback caused by the creation of noxious odors. This latter result is especially detrimental since the foam is customarily applied in buildings where occupants would be affected.

As noted, the reasons for pressure fluctuations with such type of pneumatic vertical displacement piston pump is the fact that during the repeated up and down strokes, the displacement piston is unable to pump the materials to the mixing gun at constant pressure. Additionally, such pneumatic type displacement piston pumps used in the typical foam applicating situation require large and numerous air compressors, which in turn, involve additional costs as well as the improper use of significant amounts of air. Furthermore, in an effort to overcome variations in pumping pressure, some users have resorted to additional expensive equipment having pressure equalizer chambers. However, notwithstanding these improvements, it was still not possible for a user to adjust the material pressures.

Accordingly, it will be appreciated that foam applicating systems employing such pumping devices suffered from several rather significant disadvantages.

Another prior art approach to on-site foam application systems employs a pair of electric "single diaphragm" pumps simultaneously driven by an electrically driven common prime mover for pumping the foam material constituents to a foam gun. This arrangement also has certain disadvantages. For example, the type of electrically driven diaphragm pump necessary to effectively pump the curable synthetic resin and foaming agent over relatively long distances is complicated in structure and operation. In addition, with known electric diaphragm pumps used for pumping the material, there exists a requirement for an auxiliary pressure chamber for purposes of attempting to avoid pressure fluctuations during pumping. These types of pressure chambers must also be pressurized in attempting to maintain consistent pressure throughout the typical working operation of the pump.

By virtue of the large sizes and complexities of the electric diaphragm pumps, a correspondingly large electric motor is needed to drive both pumps. Further, with relatively large electric motors, it is necessary to use special electrical power sources, thus preventing the use of standard 110 volt electrical outlets. Thus, the motor must be supplied with adequate current from the outside power lines and the attendant equipment, time, costs and labor involved for utilizing such equipment and systems are accordingly increased.

Another problem results from the fact that such motors require more electrical power, thereby rendering them more expensive. Moreover, the pump and associated equipment has such a complicated construction that there is an increased tendency for it to function improperly during normal customary use.

In addition to the foregoing deficiencies in the electric diaphragm pump system, it has nevertheless been determined that such undesirable pressure variations do actually exist in such systems. While not as severe as those encountered with other known systems, nonetheless the pressure fluctuations encountered are of sufficient dimensions to cause inconsistencies and deficiencies in the final foam product similar to those previously described.

Certain other prior art systems utilize belt driven pumps for delivering the constituent materials, a system which not only caused severe power losses, but which resulted in the classical inconsistencies and inaccuracies in the material flows which have been responsible for the production of inferior foam materials.

In general, with all of the above systems, additional problems were encountered with cold temperatures, particularly below about 55° F., since the materials become more viscous and did not flow freely or evenly. Thus, under cold temperature conditions, greater pressures were normally required and pressure fluctuations—as well as their adverse results—were magnified. I have invented a system for the ultimate production of foam materials of the type mentioned, which is not only simple, economical and trouble free, but which provides the requisite foam consistency and uniformity while avoiding the disadvantages of the prior art.

SUMMARY OF THE INVENTION

It, accordingly, is an object of the present invention to overcome the aforementioned problems associated with the generally known approaches taken in this field by providing a novel and improved system for and method of continuously, and accurately pumping the proper proportion of material constituents to and through a foam mixing gun so as to form and dispense foamed products in a simple, reliable, consistent and trouble free fashion. This and other objects of the instant invention will become apparent from a reading of this specification, including the drawings and claims thereof.

A system is disclosed for providing materials at preselected substantially constant pressures to a mixing apparatus for use in producing and dispensing foamed material which comprises, means for storing a synthetic resinous material, means for storing at least a foaming agent material, first means for continuously pumping the synthetic resinous material from the synthetic resinous material storing means to the mixing apparatus at preselected substantially constant pressures, second means for continuously pumping the foaming agent material from the foaming agent storing means to the mixing apparatus at preselected, substantially constant pressures, and means to provide a gaseous medium under pressure to the mixing apparatus simultaneously with said synthetic resinous and foaming agent materials so as to facilitate the formation of a relatively homogeneous and continuous cellular foamed material.

Towards this particular end and broadly in accordance with the invention, the improved system is particularly adapted for the continuous production and application of foam material with and through a mixing gun. A variety of mixing guns can be utilized in the system and method of the instant invention to realize the objects described herein. However, the more preferred type of gun for use in and with the instant system and method is that disclosed in Hasselman, U.S. patent application Ser. No. 573,120, filed Apr. 20, 1975, now U.S. Pat. No. 4,103,876 issued Aug. 1, 1978 the disclosure of which is hereby incorporated herein by reference. Such system further includes first and second storage means with respective delivery lines for delivering a foaming agent, preferably an aryl sulfonic acid solution, which may include other ingredients, such as phosphoric or oxalic acid, curing agents, from the first storage means and curable synthetic resinous material from the second storage means, and fluid compressing means for supplying pressurized air to the mixing gun. For cold weather operation, such as in temperatures less than about 55° C., constant material pressures and continuous flow conditions are additionally promoted by directing the materials to heaters, preferably thermostatically controlled electrical heating devices.

The pumps are preferably multi-diaphragm piston-type pumps, each diaphragm having overlapping output power characteristics such that continuous material flow conditions are provided under selected constant pressure conditions. In another embodiment, internal gear type pumps are used to provide the continuous and constant pressure flow conditions. Notwithstanding the pumps used, it is, in any event requisite to utilize pumps, preferably conjointly driven and capable of providing continuous flow conditions at preselected constant pressures over a wide range, i.e., 0–250 p.s.i.g.

In the first embodiment disclosed, the system comprises driving motor means, and first and second internal gear pumping means operatively connected to said motor means and being conjointly driven thereby with each of said first and second internal gear pumping means fluidically interconnecting the first and second storage means, respectively, to the mixing gun for accurately, continuously and proportionately pumping the foaming agent and synthetic resinous materials to the gun. Each of the first and second internal gear pumping means comprise an internal pumping gear arrangement having a shaft connected to and driven by the motor with a rotor attached to one end thereof and a rotatable idler member operatively connected with the rotor for continuously and uninterruptedly pumping the foaming agent and resinous materials to and through the foam gun in conjunction with a pressurized fluid such as compressed air at constant pressure in response to rotation of the shaft by the motor means.

In the second embodiment, a system is disclosed for providing materials at preselected substantially constant pressures to a mixing apparatus for use in producing and dispensing foamed material which comprises, means for storing a synthetic resinous material made at least from urea and formaldehyde, means for storing at least a foaming agent material such as an aryl sulfonic acid, a first multi-diaphragm piston-type pump for continuously pumping the synthetic resinous material from the synthetic resinous material storing means to the mixing apparatus at preselected substantially constant pressures and substantially consistent flow conditions, a second multi-diaphragm piston-type pump means for continuously pumping the foaming agent material from the foaming agent storing means to the mixing apparatus at preselected, substantially constant pressures and substantially constant flow conditions, a gear box positioned and connected to conjointly drive the first and second pumps at preselected rotational speeds to direct the synthetic resinous material to the mixing apparatus, an electric motor positioned and connected to drive the gear box, an air compressor adapted to provide compressed air to the mixing apparatus simultaneously with the synthetic resinous and foaming agent materials so as to facilitate the formation of foamed material, a heat exchanger for heating the compressed air prior to enterng the mixing apparatus, means to regulate the flows of synthetic resinous and foaming materials delivered by the first and second pumps, and metering means to control the pressures of the synthetic resinous material, foaming agent and compressed air to provide a generally homogeneous and continuous cellular foam material of predetermined density.

The invention also comtemplates a method for continuously producing foamed material in a system having a mixing apparatus capable of producing and dispensing the foamed material, first means for storing a synthetic resinous material, second means for storing at least a foaming agent material, and a source of pressurized gaseous medium comprising, continuously pumping the synthetic resinous material from the first storage means to the mixing apparatus at individual, preselected, and substantially constant pressures, simultaneously and continuously pumping the foaming agent material from the second storage means to the mixing apparatus at individual, preselected, and substantially constant pressures, simultaneously directing the pressurized gaseous medium to the mixing apparatus, and mixing in the mixing apparatus, the synthetic resinous material, the foaming agent and the gaseous medium so as to form a relatively homogeneous and continuous cellular foamed structure due to the maintenance of substantially constant pressures when pumping the materials.

The instant method contemplates continuously producing and applying the foam material. By simultaneously pumping the curable synthetic resin formed from urea and formaldehyde, with or without additional monomers or reactants, and an aryl or alkyl aryl sulfonic acid or equivalent foaming agent material in predetermined pressure and weight ratios, either by and through multi-diaphragm piston-type pumps or internal gear pumps at a constant pressure free of pressure fluctuations, to and through the mixing gun, while also simultaneously providing heated compressed air to the mixing gun, a superior uniform foamed product having homogeneous and continuous characteristics is produced.

While the preferred embodiments disclosed herein relate to foam forming systems which utilize urea-based synthetic resinous materials, other foam-forming systems are contemplated within the present invention.

In addition, depending upon the requirement, in a given situation, features of either of the embodiments disclosed may be used with the other embodiment without departing from the scope of the invention. For example, the gear box, metering valves and other features of the alternate preferred embodiment disclosed hereinbelow may be utilized with the first disclosed embodiment.

BRIEF DESCRIPTION OF THE DRAWINGS

The above and other objects, features and advantages of the present invention will become readily apparent after reading a detailed description thereof when viewed in conjunction with the accompanying drawings wherein like reference numerals indicate like structure throughout the several views.

DETAILED DESCRIPTION OF THE PREFERRED EMBODIMENT

In the description which follows, by catalyst-type of foaming agent, I mean a surfactant reagent material, which when mixed with the synthetic resinous material, actually cross links with the macro molecules thereof, e.g. with the urea formaldehyde polymer, so as to complete the polymerization process of the synthetic resinous material, and facilitate the formation of a cellular foam structure. By polymerization, I refer to the linking of low molecular weight compounds to form compounds of greater molecular weight, i.e., molecules of greater chain length are formed through the linkage of the smaller molecules. In the preferred form, an aryl sulfonic acid foaming agent is used, sulfonic acid being the reaction product derived from sulfuric acid and such alkylated aromatic compounds as naphthalene, benzene and the like. The sulfonic acid foaming agent to which I refer throughout the description may or may not include a minor percentage of curing agent, as for example, phosphoric or oxalic acid, which curing agent in turn accelerates the cross-linking action of the foaming agent with the partially polymerized synthetic resinous copolymer. In addition, all references to pressures, including those relating to material pressures, air pressures and the like, are directed to pressures which are measured relative to atmospheric pressures. Accordingly, all stated pressures refer to gauge pressures, with zero p.s.i.g. being atmospheric pressure.

Figure 1:
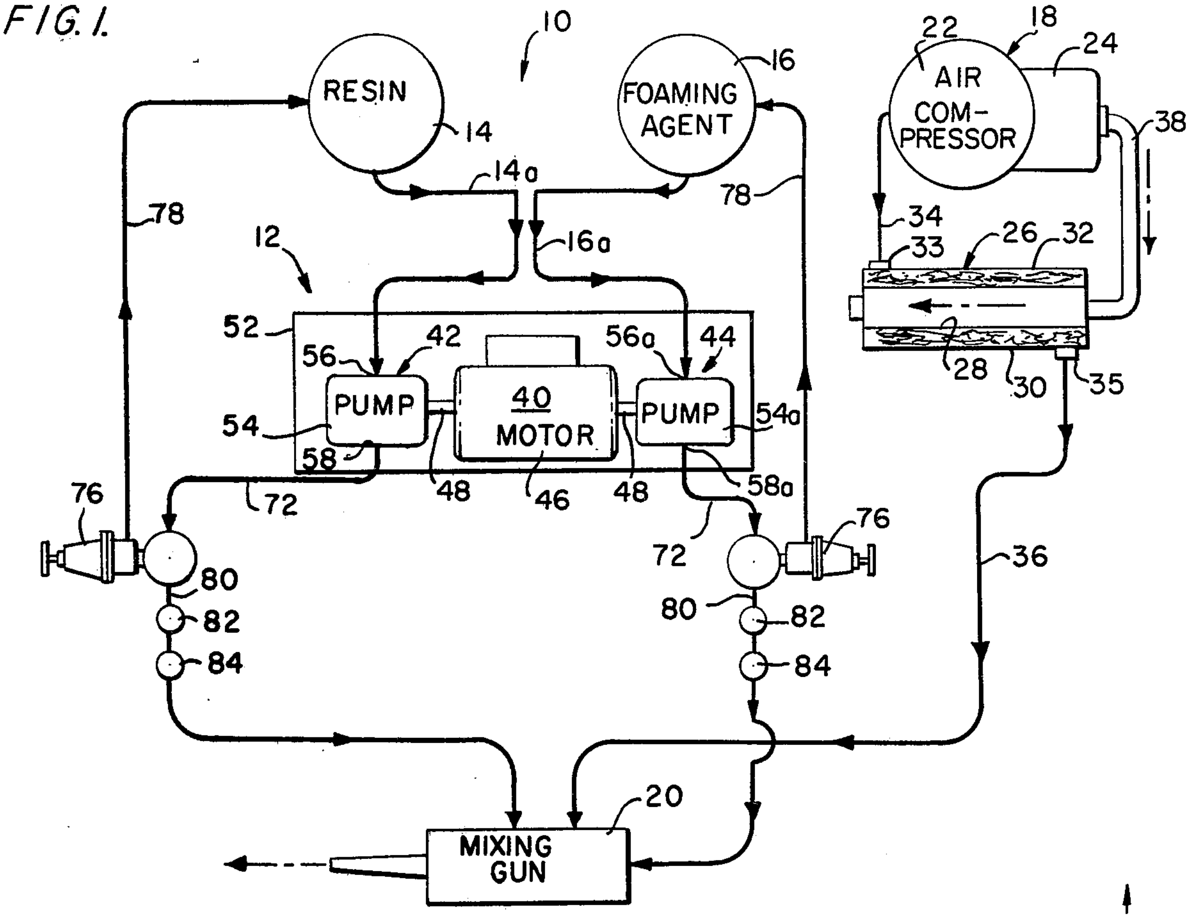
FIG. 1 is a diagrammatic representation illustrating the novel and improved on-site foam producing and applicating system of the present invention.

Referring to FIG. 1 of the drawings, there is illustrated in diagrammatic form, a preferred embodiment of the present system for forming and dispensing foam material of the type used in the building industry for thermal or acoustical insulation. The foam producing system 10 shown may be used in a variety of different types of on-site job locations because it is capable of continuously and accurately proportioning the materials to be admixed to form a consistent and continuous foam material in a versatile, simple, reliable, inexpensive and trouble-free manner.

Referring again to FIG. 1, the foaming system 10 includes pumping assembly 12, first and second storage vessels 14 and 16, respectively, air compressor 18, and foam mixing gun 20.

Individual ones of the first and second storage vessels 14 and 16 may be formed from any standard type of vessel or drum which appropriately stores various materials essential for forming the foam product. In the embodiment illustrated in FIG. 1, the first storage vessel 14 is constructed to store any suitable type of a curable synthetic resinous material. For example, urea formaldehyde may be stored in vessel 14 or similar based resins such as melamine formaldehyde, urea furfural formaldehyde, and the like may also be stored. Storage vessel 16, on the other hand, is constructed to contain a suitable catalyst-type of foaming agent if desired, including approximately 0.1% by weight of the foaming agent, of phosphoric (or oxalic) acid curing agent.

Storage vessels 14 and 16 are provided with standard hardware to provide fluid connections, whereby the stored materials may be withdrawn therefrom and returned thereto. Flexible delivery lines 14*a* and 16*a* are connected to vessels 14 and 16, respectively, to permit the transfer of the resinous and foaming agent materials to the pumping assembly 12. The flexible delivery lines 14*a* and 16*a* are positioned adjacent one another within an outer conduit (not shown).

Air compressor 18 delivers the requisite amounts of air under pressure to mixing gun 20. The pressurized air serves to admix with the foaming agent and resinous materials to facilitate formation of the foam. As stated previously, the mixing gun 20 may be of any of the type used in the foam applicating field to manufacture and dispense foam in a given area.

Air compressor 18 is driven by gasoline engine (or other type) 24, the exhaust hose 30 of which is connected to heat exchanger 26 to permit exhaust gases from engine 24 to enter heat exchanger 26. Heat exchanger 26 includes inner and outer cylindrical metallic shells 28 and 30, respectively, and end walls, the centers of which are provided with suitable openings to receive and exit the exhaust gases from exhaust hose 38. Outer shell 30 also includes inlet 33 and outlet 35 for permitting passage of pressurized compressor air from compressor 22. Wire mesh 32 or other similar heat conductive and porous material is interposed in the thin annulus formed by and between the inner and outer shells 28 and 30. Air line 34 connects compressor 18 to the inlet 33 of the outer shell 30 to direct pressurized air into the thin annulus, while a flexible delivery line 36 fluidically interconnects the outlet 35 of the outer shell 30 and the mixing gun 20. As the heated exhaust gases flow through heat exchanger 26, heat is dissipated as they travel therethrough. In the heat exchanger, the compressed air flows in a direction generally opposite the exhaust gases as well as through a somewhat tortuous path created by mesh 32. The mesh 32 delays the passage of the compressed air and permits heat to be transferred thereto from the exhaust gases. It should be pointed out that by heating the compressed air from compressor 18 in the heat exchanger 26, the subsequent mixing which occurs within the mixing gun 20 is greatly facilitated in those situations in which the ambient temperatures are relatively low, since under low ambient temperatures, the resinous and foaming agent materials do not generally flow or mix as easily and rapidly as desired. Alternately, in place of mesh 32, a steel (or other) spirally configured or equivalent tortuous path creating device may be used.

It should be noted that the schematic illustration of FIG. 1 does not illustrate the delivery line 36 adjacent to the delivery lines 14*a* and 16*a*. However, it is nevertheless envisioned by the invention that delivery line 36 may very well be positioned adjacent the other lines such that the heated compressed air exiting heat exchanger 26 through delivery line 36 will heat delivery lines 14*a* and 16*a* which carry the resinous and foaming agent materials. Accordingly, this reduces the adverse effects caused by cold ambient temperatures in the field.

Figure 2:
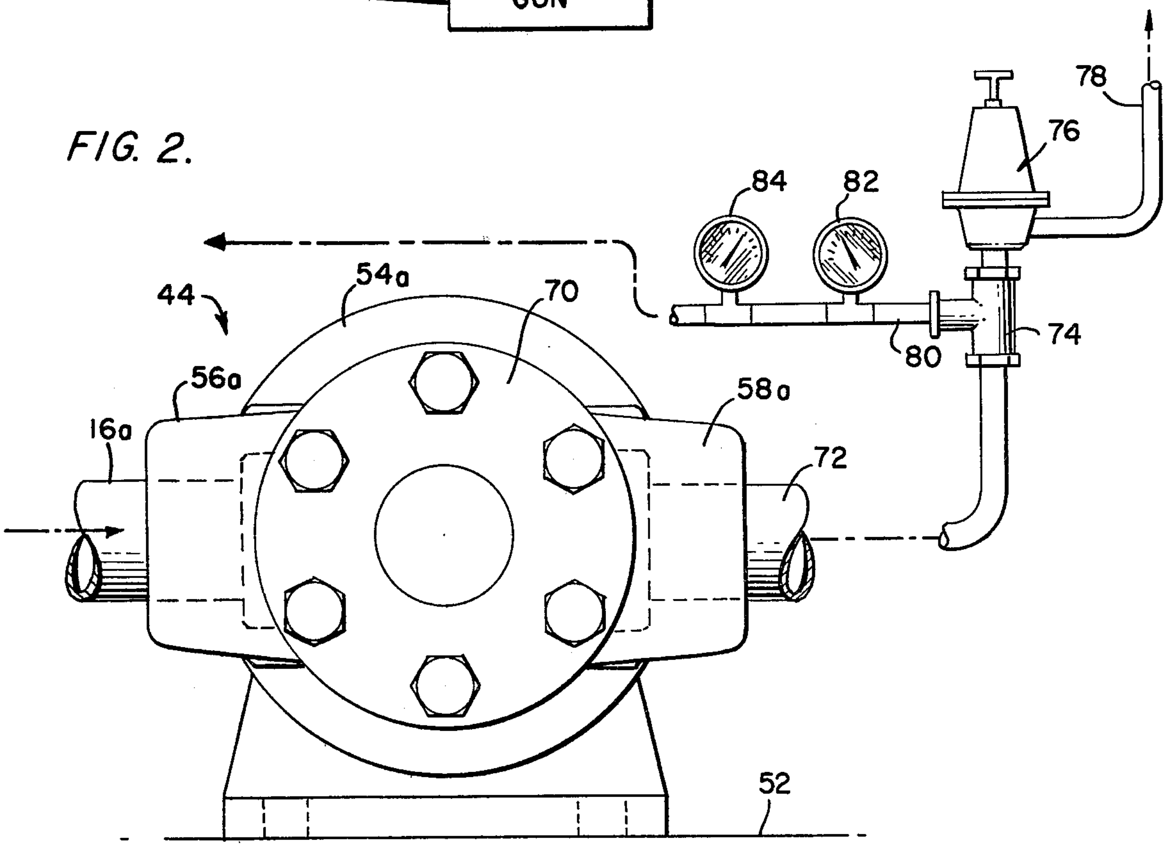
FIG. 2 is an elevational view of a portion of the system, with structure removed for purposes of clarity, illustrating a feature of the present invention.
Figure 3:
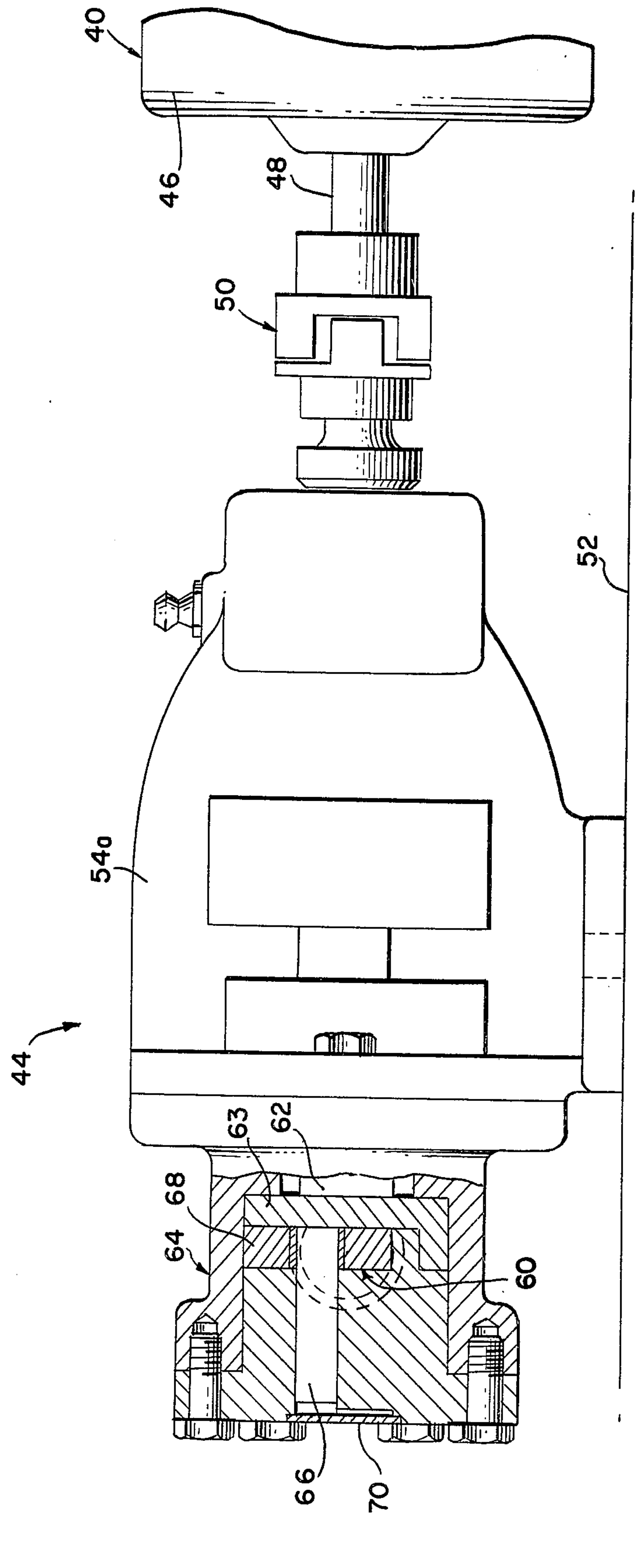
FIG. 3 is a side elevational view, partly in cross-section, illustrating a type of internal gear pumping arrangement contemplated by the arrangement of FIG. 1.

Reference is now made to FIG. 1 in conjunction with FIGS. 2 and 3. As shown, pumping assembly 12 includes motor 40, preferably an electric motor 46, and a pair of internal gear type pumps 42 and 44, respectively, as shown. Electric motor 46 has a pair of rotatable driving shafts 48 extending from opposite ends thereof, each of the driving shafts being arranged to be driven in unison with the other so as to drive pumps 42 and 44 in unison.

As shown in FIG. 3, drive shafts 48 each have a standard coupling device 50 at their opposite ends which connect each of the shafts 48 with the individual first and second internal gear pumps 42 and 44, respectively. As shown schematically in FIG. 1, a support stand 52 provides support for the entire pumping assembly 12. The support stand 52 may include suitable handles (not shown) to increase the portability of the pumping assembly 12.

Internal gear pumps 42 and 44 are particularly advantageous in pumping resinous and catalyst foaming agent materials to the mixing gun 20 in foam forming situations. In particular, each of the respective pumps 42 and 44 serves to continuously, consistently and uniformly pump predetermined amounts and/or volumes of the materials to the mixing gun 20. Pumping is accomplished under substantially constant pressures to provide the conisstent and uniform flow of materials. Internal gear pumps 42 and 44 provide the pumping operation in an measurable manner free from pressure fluctuations. As a result, the previously mentioned deficiencies associated with the foam not being of proper and uniform composition because of pressure fluctuations and inconsistent flow have been substantially reduced or eliminated. The preferred embodiment does not envision the use of identical types of internal gear pumps, although it is within the scope of this invention that such may be employed.

The expression "internal gear pump" herein relates to a type of pump wherein fluid is pumped by the intermeshing relationship of gear members wherein at least one gear member has internal type teeth as opposed to pumps having a pair of externally meshing teeth. In a preferred embodiment of the instant invention, internal gear pumps 42 and 44 are Viking model F 432 and Viking model F 4742, respectively, pumps which are particularly useful for passage of urea formaldehyde based resins and sulfonic acid foaming agents. These pumps are commercially available from Viking Pump Division, Houdaille Industries, Inc., Cedar Falls, Iowa 50613. Of course, neither this brand pump nor the particular models mentioned must be used, but pumps of the same general type as the Viking pumps are preferred. In a preferred embodiment, first internal gear pump 42 may be of a type similar to the first referenced model, whereas pump 44 is of the last mentioned type. It should be pointed out, however, that no matter what types of pumps are used, they must share the significant common characteristic of having a similar type of internal gear assembly 60, to be later described, for metering and pumping the materials.

One basic reason for having different model or size pumps to pump the different materials is because of viscosity differences in the material. The appropriate model or size pumps can be selected easily if one knows the composition of the resin and foaming agent to be pumped and the amount of foaming agent necessary to give the foamed product specified.

In all situations, however, both pumps 42 and 44, respectively, include the following similar structure; housing 54, 54*a*, having inlet and outlet orifices 56, 56*a* and 58, 58*a*, respectively. Delivery lines 14*a* and 16*a* are suitably fluidically connected to the inlet orifices 56 and 56*a*, respectively, for permitting delivery of the stored materials to first and second pumps 42 and 44, while internal gear assemblies 60 are similar.

FIG. 3 shows one form of second pump 44 having internal gear assembly 60. Assembly 60 is of a type essentially similar to an internal gear assembly of pump 42. Insofar as both gear assemblies are similar, only one assembly has been shown in FIG. 3.

Internal gear assembly 60 includes an input shaft 62 suitably journalled for rotation within housing 54*a*. One end of shaft 62 is connected to the coupling device 50 so as to be driven in unison with driving shaft 48 and is connected to rotor 63 of known construction. Idler assembly 64 has idler pin 66 and idler member 68 suitably retained within housing 54 by end plate 70. Idler member 68 intermeshingly cooperates in a conventional fashion with rotor 63 so as to pump in a continuous, predetermined and accurate manner, the catalyst foaming agent material from the storage vessel 16 through outlet 58*a* and then at constant uninterrupted pressure to and through the mixing gun 20 for purposes of forming and placing foamed material.

As noted, it is within the spirit and scope of this invention that pump 42 also includes a similar form of internal gear assembly means 60 having a similar rotor and idler member cooperating to pump the materials in the manner previously described. Of course, this invention envisions that the structural components forming the pumps 42 and 44 are selected so as to be compatible with the materials being pumped so as to minimize corrosion. For example, if the foaming agent solution is acidic, metal parts particularly resistant to acid conditions will be used in the gear pump. In addition, the materials are selected so as to prevent mechanical wear and tear such as galling.

While the embodiment in FIG. 3 discloses a simple type of internal gear pump, it will be appreciated that other types are envisioned within the spirit and scope of the invention so long as they basically include an internal gear or other pumping arrangement—another example of which will be later described—of the type capable of providing consistent and constant pressure and flow conditions. In the present embodiment, the pumps each have generally elongated rotatable shaft with a rotor member attached thereto and cooperating with an idler member for pumping the synthetic resin and foaming agent catalyst as aforementioned. It will at once be appreciated that such pumps provide significant advantages over the heretofore known approaches for pumping foaming agent and resinous materials to and through a mixing gun. Since the pump employed is simply constructed, electric motor 46, which rotatably drives the shaft 48, need not be of significantly high power. Correspondingly, of course, this means that inasmuch as the motor 46 has a lower power rating and is smaller, the current supply thereto need not be as great. Thus, the electric motor 46 need not have a horsepower greater than what would be necessary for connection to a standard 110 volt power line. Another advantage which results is elimination of the need to make extraneous electrical connections to outside power lines for purposes of having more power for larger motors.

The material exiting the outlets 58, 58*a* under constant pressure will be delivered to delivery lines 72 which are connected to one branch of a conventional type of tee-coupling 74. As clearly shown in FIG. 2, the tee-coupling 74 has connected at the opposite branch thereof, a standard adjustable type pressure relief valve generally indicated by reference numeral 76. Such pressure relief valve 76 is of the type which regulates the maximum pressure which can be delivered to the mixing gun 20. Return lines 78 connect the pressure relief valves 76 to the respective vessels 14 and 16. Consequently, such pressure relief system furhter guarantees that a controlled amount of pressurized material will be delivered to the mixing gun 20 in a continuous manner free of any pressure fluctuations. Although not generally necessary for the operation of foaming system 10, it will be noted that the outlet delivery line 80 has suitably fluidically connected thereto, pressure gauge 82 and temperature gauge 84. Thus, an operator would be able to quite readily ascertain the temperature and pressure of the material in order to effectively monitor operation of system 10. By adjustment of either or both of the pressure relief valves, it is possible, through recirculation, to finely regulate the volume and pressure of the synthetic resin and the foaming agent (including curing agent) being delivered to the mixing gun. Thus, in circumstances requiring delivery lines of extended length, the pump assembly wil be utilized to provide sufficient material pressures such that pressure losses in the delivery are insignificant. Thus, the final pressures at the mixing gun may be carefully controlled and constant material pressures, with continuous and uniform flow of materials, may be guaranteed.

Upon understanding the above structural components and their organization and operation, it will be at once appreciated that several of the disadvantages heretofore associated with the use of conventional on-site foaming systems are overcome. In particular, the pumping of the resinous and foaming agent material and curing agent (when desired) is accomplished in a metered manner at constant pressure which is free of fluctuations. Thus, the components mixing in the gun 20 will do so in the correct predeterimined ratio. Moreover, the pumps are simple in construction and operation. Hence, there is less likelihood of mechanical failure. In addition, the simplicity of such type of internal gear pumping arrangement serves to enable the utilization of an electric motor having a horsepower which enables it to be directly driven from standard 110 volt outlines. Importantly, the resinous and foaming agent materials are admixed in the desired proportion.

Characteristically utilizing the specific Viking pumps identified at pages 17 and 18 of this specification, a urea formaldehyde based resin and an acidic sulfonic foaming agent, suitable foam materials can be obtained and dispensed using resin pressures at the mixing gun of about 30 p.s.i.g. to about 120 p.s.i.g. and foaming agent (including curing agent) pressures at the mixing gun of about 30 p.s.i.g. to about 80 p.s.i.g. Depending upon transmission line lengths and consequent losses, resin and foaming agent pressures at the pump may range from zero to 250 p.s.i.g. Foaming agent (including curing agent) to resin weight ratio is selected in the range of from about 1 to about 0.9 divided by 1 to about 1.5 and the compressed air pressure selected in the range of from about 30 p.s.i.g. to about 150 p.s.i.g.

Figure 4:
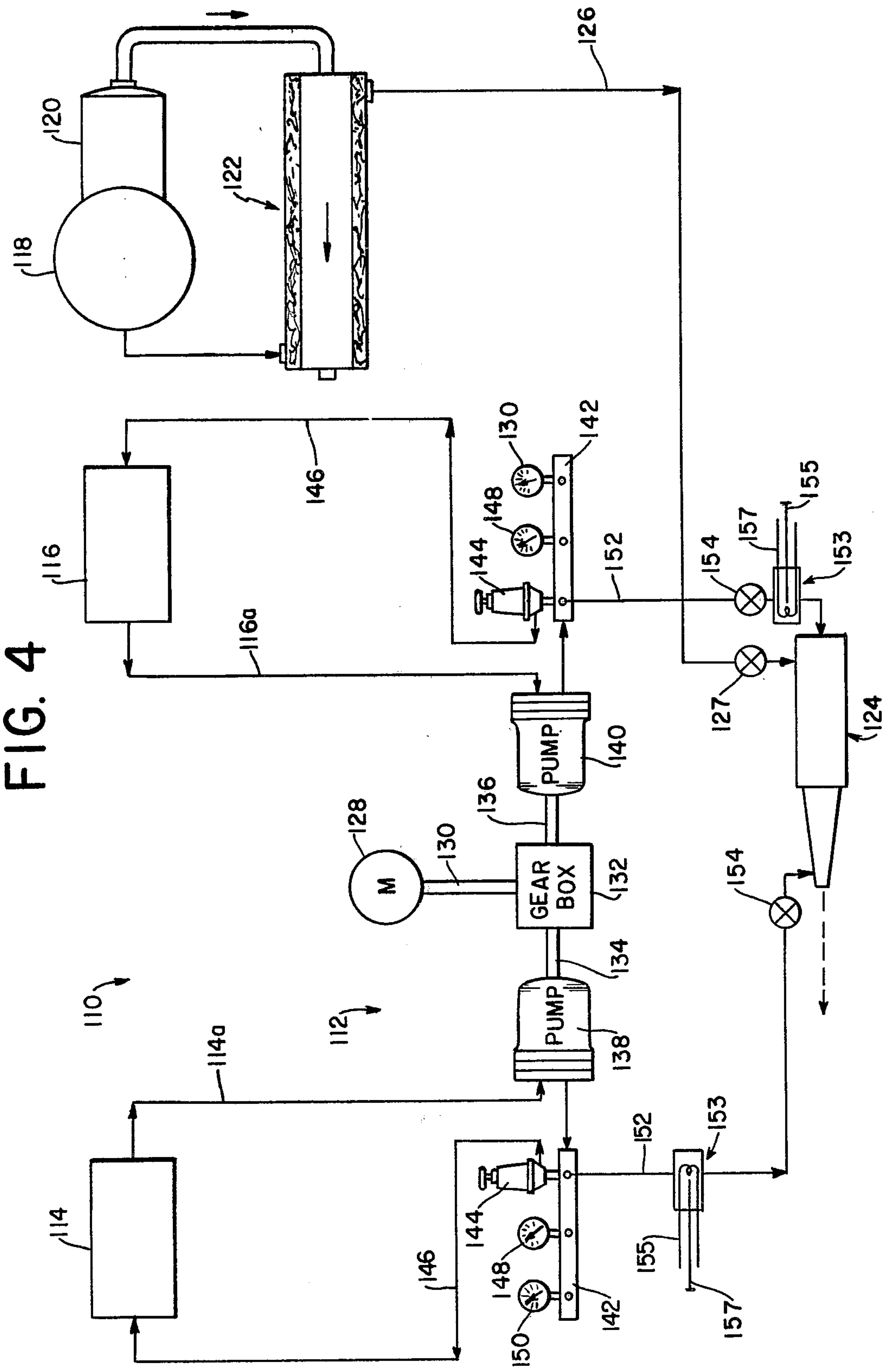
FIG. 4 is a diagrammatic representation of an alternate preferred embodiment of the invention illustrated in FIG. 1.

Referring to FIG. 4 there is shown, an alternate preferred embodiment of this invention. In this embodiment, foaming apparatus 110 includes pumping assembly 112, first and second storage vessels 114 and 116, air compressor 118, gasoline engine 120, heat exchanger 122 and mixing gun 124.

Storage vessel 114 contains curable synthetic resinous material of the type described with respect to the embodiment of FIGS. 1–3 to form a foam material. Storage vessel 116 contains a suitable foaming agent material as previously described. Storage vessels 114 and 116 include hardware which enables the stored materials to be easily withdrawn from, and returned to, the vessels. Fluid line **114*a* allows synthetic resinous material to flow from vessel 114 to pumping assembly 112, while fluid line 116*a* allows the foaming agent to flow from vessel 116 to pumping assembly 112. Air compressor 118 which is driven by gasoline engine 120 delivers preselected quantities of compressed air at individual, preselected pressures to mixing gun 124 via heat exchanger 122**.

Heat exchanger 122 is fluidically connected to engine 120 and is of the type similar to the heat exchanger described in the previous embodiment. Compressed air travels through the heat exchanger 122 and is heated by the heated exhaust which exits engine 120 and travels through the heat exchanger 122 opposite the direction of exhaust. Air line 126 allows the heat compressed air to travel from heat exchanger 122 to mixing gun 124.

This heated air facilitates the mixing action in mixing gun 124, especially when mixing is accomplished in cold weather. Although not shown in the drawings, air line 126 is positioned adjacent fluid lines **114*a* and 116*a* so as to transfer heat to the materials in the lines thereby causing the viscosity of the materials to be reduced. A needle valve 127 is connected to air line 126 so as to facilitate fine control of the final pressure and quantity of compressed air entering mixing gun 124**.

Pumping assembly 112 as shown in FIG. 4 includes an electric motor 128, preferably of the type operable on a standard 110 volt outlet. Use of this type of motor will result in significant energy savings when contrasted to a motor requiring 220 volts. Motor 128 has a driving shaft 130 rotatably driven at individual preselected speeds.

Driving shaft 130 is connected to gear boxs 132 which continuously and simultaneously transfers the rotative power of driving shaft 130 to pump shafts 134 and 136. For this purpose gear box 132 includes a gearing arrangement which is capable of providing such power transfer. In practice, the gearing arrangement includes a worm gear (not shown) attached to driving shaft 130. The worm gear simultaneously cooperates with a helicut gear (not shown) connected to pump shaft 134 and a helicut gear (not shown) connected to pump shaft 136. Pump shafts 134 and 136 in turn drive pumps 138 and 140, respectively. The gear ratio between the worm gear and helicut gears is selected to reduce the angular velocity of both pump shafts 134 and 136 relative to the angular velocity of driving shaft 130. The rotational speed of driving shaft 130 relative to the rotational speeds of pump shafts 134 and 136 can be changing the gear ratio.

Referring again to FIG. 4, electric motor 128 is vertically positioned between the spaced apart and horizontally mounted pumps 138 and 140. This positioning provides a compact pumping assembly 112.

Pumps 138 and 140 are hydraulic multi-piston diaphragm pumps similar in construction and operation to the pumps described in U.S. Pat. Nos. 3,774,030 and 3,884,598, both to Wanner. In any event, pumps 138 and 140 must be capable of pumping at individual, preselected, and substantially constant pressures, which in turn may be selectively metered in accordance with the foam specifications at a given situs. In their preferred form, pumps 138 and 140 insure maintenance of constant pressures throughout the pumping operation because they have three individual piston diaphragm units which are arranged and sequenced to provide overlap of power and return strokes. Accordingly, cyclical pressure fluctuations which normally occur in a single reciprocating standard piston-type pump are obviated. An advantage of these pumps is that constant pressure, which is critical in the foam forming operation, can now be achieved, and individual requisite pressure values are now obtainable. At the pump, such pressure adjustments may be accomplished by changing the speed of pump shaft 134 and 136, while fine adjustments are made possible by needle valves 154 as will be described in further detail.

The synthetic resinous material discharged from pump 138 is directed to manifold 142 where adjustable pressure regulator 144 is utilized to control the quantity and pressure of synthetic resinous material actually entering the mixing gun 124. Return line 146 fluidically connects regulator 144 to supply vessel 114 to return to supply vessel 114, that portion of the synthetic resinous material which regulator 144 does not direct to mixing gun 124.

Pressure gauge 148 and temperature gauge 150 are connected to manifold 142 to measure the temperature and pressure of the synthetic resinous material. The synthetic resinous material flows from manifold 142, through line 152 to needle valve 154 prior to entering mixture gun 124. Needle valve 154 meters down the pressure and quantity of resinous material from entering mixing gun 124. This type of valve has been found to suitably control the material flow conditions without becoming clogged.

The foaming agent and curing agent discharged from pump 140 flows by means of a conduit to manifold 142. An adjustable pressure regulator 144 is connected to manifold 142 to control the pressure and quantity of synthetic resinous material introduced to mixing gun 124. Return line 146 fluidically connects regulator 144 to supply vessel 116 to return to supply vessel 116 that portion of the foaming agent and curing agent which regulator 144 does not direct to mixing gun 124. Pressure gauge 148 and temperature gauge 150 are connected to manifold 142 to measure the pressure and temperature of the foaming agent.

Foaming agent material flows through outlet lines 152 to needle valves 154 prior to entering mixing gun 124. Needle valves 154 function in the same manner so as to regulate the pressure and amount of synthetic resinous material entering mixing gun 124.

In operation, driving shaft 130 simultaneously and continuously drives pump shafts 134 and 136 through gear box 132. The torque and rotational speeds of pump shafts 134 and 136 are selected to drive pumps 138 and 140, respectively, so as to discharge the pumped materials continuously at individual, preselected and constant pressures and capacities. Pumps 138 and 140 discharge the synthetic resinous material and foaming agent at the pumps at pressure ranges from about 0 to 250 p.s.i.g., while at the mixing gun, resin pressures are metered down to between 40 and 100 p.s.i.g. and foaming agent pressures at the gun are metered down to between 30 and 100 p.s.i.g., depending upon requirements. Thus, the type of foam produced can be controlled by varying the pressures of the synthetic resinous material and foaming agent.

The gear ratio of gear box 132 can be suitably changed for increasing or decreasing the rotational speed ratio of driving shaft 130 relative to pump shafts 134 and 136. By increasing this ratio, the torque developed by the pump shafts increases. Increased torque and lower speed cause pumps 138 and 140 to discharge at higher pressure and lower capacity. Conversely, by decreasing the noted ratio, the torque developed by the pump shafts is decreased and the pumps discharge at lower pressure and higher capacity. Whatever pressures and capacities are discharged, however, should be sufficient for adequately supplying a plurality of mixing guns. In the preferred form, the gear box is arranged to provide an output r.p.m. at shafts 134 an 136 approximately one-fifth of the r.p.m. of the electric motor 128, thus delivering the power to the pumps at high torque.

The synthetic resinous material is pumped from pump 138 to manifold 142. Regulator 144 controls the pressure and quantity of the resinous material flowing from manifold 142 to mixing gun 124. Pressure gauge 148 and temperature gauge 150 enable an operator to ascertain the pressure and temperature of the pumped resinous material. Needle valve 152 controls the final pressure quantity of the resinous material entering mixing gun 124.

The foaming agent material is pumped from pump 140 to mixing gun 124. During travel to the gun 124, the regulator 144, pressure gauge 148, temperature gauge 150 and needle valve 154 function in the manner indicated above in connection with the control of the synthetic resinous material. If required, under cold weather conditions, such as below about 55° F., heating units 153 may be used to heat the synthetic resinous and foaming agent materials. Preferably the heating units utilize electrical heating elements 155 and thermostatic controls 157 to maintain uniform and constant material temperatures and to promote constant pressures and continuous flow conditions, examples of such heating units are of the type marketed as Model No. "B" Electrical Heaters by Chromalox Corp.

Simultaneously with the foregoing pumping procedure, the air compressor 118 directs suitable amounts of compressed air under preselected pressure to mixing gun 124. This compressed air is heated as it travels through heat exchanger 124. Air line 126 carries the heated air to the mixing gun 124. Although not shown, air line 126 can be positioned in adjacent relation to fluid lines 152 and the heat from the heated compressed air can thereby be transferred to the pumped materials in the lines so as to make them flow easier. As mentioned previously, this feature is extremely useful in cold weather. Needle valve 127 controls the final pressure and quantity of compressed air entering mixing gun 124.

Mixing gun 124 can be of any known type which first mixes the foregoing materials so as to form a relatively homogeneous and continuous cellular foam structure, and then directs such foam structure away from the gun towards a point of application. After the delivery is completed, the foam cures over a period of time so as to form a relatively hard foam material.

The density of the foam can be varied by the amount of air utilized in its formation. In most insulation requirements, foam having a density of about 92 to 94% air is preferred. Such density has been determined to give the best "R" factor, a measure of the insulation properties of the foam.

With reference to the foam formation, if the pressure of the synthetic resinous material is increased, the foam density will, accordingly, increase. If the pressure of the foaming agent material is increased, the foam density will, accordingly, decrease.

In most applications satisfactory foam materials can be obtained with a urea formaldehyde based resin and an acidic sulfonic foaming agent. Preferably, a resin pumping pressure, metered to the mixing gun, is selected in the range of about 40 p.s.i.g. to about 100 p.s.i.g. and a sulfonic foaming agent and curing agent is metered to the mixing gun between 30 and 100 p.s.i.g. Since extensive delivery lines often result in substantial line pressure losses, it is preferred to deliver the synthetic resin and foaming agent at the pump at pressures of between zero and 250 p.s.i.g., thus allowing for substantial metering control wherevers necessary or desirable.

The foaming agent (and curing agent) to resin weight ratio is as disclosed in the previous embodiment, but is preferably within a range from approximately 1.0 to about 0.9 divided by 1.4 to 1.5. Compressed air is metered into mixing gun 124 within the range from about 40 p.s.i.g. In addition, the amount of compressed air introduced to the mixing gun 124 varies from about 4.5 to about 5 cubic feet per minute.

While the invention has been described in connection with preferred embodiments, it will be appreciated that it is not intended to limit the invention to the particular form set forth above but, on the contrary, it is intended to cover such alternatives, modifications, and equivalents as may be included within the spirit and scope of the invention as defined by the appended claims.

I claim:

1. A system for providing materials at preselected pressures to a mixing apparatus for use in producing and dispensing resinous foamed materials which comprises:

(a) means for storing a synthetic resinous material;

(b) means for storing at least a foaming agent material;

(c) first multiple diaphragm pumping means for continuously pumping said synthetic resinous material from said synthetic resinous material storing means to the mixing apparatus at a preselected substantially constant pressure;

(d) second multiple diaphragm pumping means for continuously pumping the foaming agent material from said foaming agent storing means to the mixing apparatus at a preselected, substantially constant pressure; and (e) means to provide a gaseous medium under pressure to said mixing apparatus simultaneously with said synthetic resinous and foaming agent materials so as to facilitate the formation of a relatively homogeneous and continuous cellular foamed material.

2. A system for continuously producing and dispensing a relatively homogeneous and continuous resinous cellular foam material which comprises:

(a) means for mixing synthetic resinous material, at least a foaming agent material and a gaseous medium under pressure for producing and dispensing the foam material;

(b) means for storing a synthetic resinous material;

(c) means for storing at least a foaming agent material;

(d) first multiple diaphragm pumping means capable of continuously pumping said synthetic resinous material from said synthetic resinous material storing means to said mixing means at an individual, preselected and substantially constant pressure;

(e) second multiple diaphragm pumping means capable of continuously pumping predetermined amounts of the foaming agent material from said foaming agent material storing means to said mixing means at an individual, preselected and substantially constant pressure;

(f) means for supplying a pressurized gaseous medium to said mixing means for mixing with said synthetic resinous and foaming agent materials to facilitate formation of said foam material; and (g) means for simultaneously driving said first and second pumping means from a common source of rotative power so as to insure simultaneous pumping of said synthetic resinous and foaming agent materials at substantially constant pressures so as to produce said relatively homogeneous and continuous cellular foam material.

3. The system according to claim 2, which further comprises means for heating the pressurized gaseous medium prior to being directed to said mixing apparatus and means for heating said synthetic resinous and foaming agent materials prior to entering said mixing apparatus.

4. The system according to claim 3, wherein said means for supplying a pressurized gaseous medium comprises an air compressor and said means to heat said synthetic resinous and foaming agent materials comprises thermostatically controlled electrical heating devices.

5. The system according to claim 4, which further comprises a gasoline engine which is adapted to continuously drive said air compressor so as to supply the compressed air.

6. The system according to claim 5, wherein said heating means comprises a heat exchanger which allows heated exhaust from said gasoline engine, which is capable of heating the compressed air, to travel therethrough in a first direction and allows the compressed air to travel therethrough in a generally opposite direction so as to permit heat transfer from the heated exhaust to the heat the compressed air.

7. The system according to claim 6, wherein said driving means includes a motor having a shaft capable of being driven at a required rotative speed.

8. The apparatus according to claim 7, wherein each of said first and second pumping means are rotatably driven at preselected speeds to control the pressure and quantity of the respective materials being pumped.

9. The system according to claim 8, wherein said driving means includes means operatively connected to said motor shaft and said first and second pumping means for transmitting the rotative power of said motor to said first and second pumping means.

10. The system according to claim 9, wherein said transmitting means is in the form of a gear box.

11. An apparatus for continuously producing and dispensing resinous foamed material which comprises first and second storage means with respective delivery means therefrom for delivering foaming agent solution from said first storage means and curable synthetic resinous material from said second storage means, driving motor means, first and second multiple diaphragm piston-type pumping means operatively connected to said motor means and conjointly driven thereby, a mixing gun fluidically connected to said first and second pumping means, which in turn are fluidically connected with said first and second storage delivery means respectively, and a fluid compressing means for supplying pressurized air to said mixing gun, wherein said first and second pumping means are driven by said motor means for jointly and continuously pumping foaming agent and resinous material at constant pressure from said first and second storage means respectively in response to rotation of said pumping means by said motor means to said mixing gun, an adjustable relief valve operatively connected to each of said first and second pumping means for regulating and controlling the output pressure of the materials exiting each said pumping means whereby said foaming agent and said resinous material are continuously and substantially accurately mixed together in a predetermined ratio in said mixing gun and delivered from said mixing gun with the aid of compressed air from said compressor.

12. The apparatus of claim 11 wherein said compressing means includes an air compressor means for delivering pressurized air, an engine for driving said air compressor and delivering heated exhaust, and heat exchanger means being fluidically connected to said engine for receiving the exhaust and said air compressor such that the compressed air passing therethrough has the temperature raised by the heated exhaust.

13. The apparatus of claim 12 in which at least portions of said pumping means are adapted to pump said materials at substantially constant pressures greater than atmospheric, and are made of noncorrosive, wear resistant materials compatible with the materials passing therethrough.

14. A system for providing materials at preselected substantially constant pressures to a mixing apparatus for use in producing and dispensing resinous foamed material which comprises:

(a) means for storing a synthetic resinous material made at least from urea and formaldehyde;

(b) means for storing at least a foaming agent material;

(c) a first piston-type multiple-diaphragm pumping means for continously pumping said synthetic resinous material from said synthetic resinous material storing means to said mixing apparatus at a preselected, substantially constant pressure and substantially constant flow conditions;

(d) a second piston-type multiple-diaphragm pumping means for continuously pumping the foaming agent material from said foaming agent storing means to said mixing apparatus at a preselected, substantially constant pressure and substantially constant flow conditions;

(e) a gear box positioned and connected to conjointly drive said first and second pumping means at preselected rotational speeds to direct said synthetic resinous material to said mixing apparatus;

(f) an electric motor positioned and connected to drive said gear box;

(g) an air compressor adapted to provide compressed air to said mixing apparatus simultaneously with said synthetic resinous and foaming agent materials so as to facilitate the formation of foamed material;

(h) a heat exchanger for heating the compressed air prior to entering the mixing apparatus;

(i) means to regulate the flows of synthetic resinous and foaming materials delivered by said first and second pumping means; and (j) metering means to control at least the pressures of the synthetic resinous material, foaming agent and compressed air to provide a generally homogeneous and continuous cellular foam material of predetermined density.

* * * * *